United States Patent [19]

Isayama et al.

[11] Patent Number: 4,657,986

[45] Date of Patent: Apr. 14, 1987

[54] CURABLE RESINOUS COMPOSITION COMPRISING EPOXY RESIN AND SILICON-CONTAINING ELASTOMERIC POLYMER

[75] Inventors: Katsuhiko Isayama; Toshifumi Hirose; Takahisa Iwahara; Fumio Kawakubo, all of Hyogo, Japan

[73] Assignee: Kanegafuchi Chemical Industry Co., Ltd., Osaka, Japan

[21] Appl. No.: 812,378

[22] Filed: Dec. 23, 1985

[30] Foreign Application Priority Data

Dec. 26, 1984 [JP] Japan ................. 59-281099

[51] Int. Cl.$^4$ .............................................. C08G 65/32
[52] U.S. Cl. .............................. 525/407; 525/100; 525/101; 525/104; 525/105; 525/106; 525/476; 525/438; 525/446; 528/27
[58] Field of Search ............ 525/476, 407, 438, 446, 525/104, 105, 106, 100, 101; 528/27

[56] References Cited

U.S. PATENT DOCUMENTS 4,283,513 8/1981 Mikami ........................... 528/27
4,287,326 9/1981 Mikami ........................... 528/27

*Primary Examiner*—Melvyn I. Marquis
*Attorney, Agent, or Firm*—Wegner & Bretschneider

[57] ABSTRACT

A curable resinous composition comprising:
(A) an organic elastomeric polymer having at least one silicon-containing reactive group in a molecule,
(B) an epoxy resin,
(C) a silicone compound having a silicon-containing group and a functional group reactive with an epoxy group, and
(D) a curing agent for the epoxy resin, wherein said silicon-containing reactive group is a group of the formula:

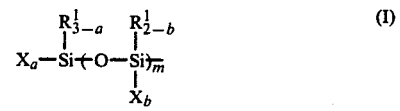

wherein X is a hydroxyl group or a hydrolyzable group, $R^1$ is a monovalent hydrocarbon group having 1 to 20 carbon atoms or an organosiloxy group, "a" is 0, 1, 2, or 3, "b" is 0, 1 or 2 provided that the total of "a" and "b" is at least 1, and "m" is 0 or an integer of 1 to 18, a weight ratio of (A) to (B) being from 1:100 to 100:1 and a weight ratio of (A)+(B) to (C) being from 100:0.1 to 100:20.

4 Claims, No Drawings

CURABLE RESINOUS COMPOSITION COMPRISING EPOXY RESIN AND SILICON-CONTAINING ELASTOMERIC POLYMER

FIELD OF THE INVENTION

The present invention relates to a curable resinous composition comprising an epoxy resin and an organic elastomeric polymer having at least one silicon-containing reactive group in a molecule. More particularly, it relates to a curable resinous composition comprising an epoxy resin, an organic elastomeric polymer having at least one silicon-containing reactive group in a molecule, a silicone compound having a silicon-containing reactive group and a functional group reactive with an epoxy group, and a curing agent for the epoxy resin, which affords a cured product having improved mechanical properties such as flexibility, impact resistance, toughness and strength.

BACKGROUND OF THE INVENTION

An epoxy resin finds various applications such as a molding material, an adhesive, a coating, a plywood, a laminate and the like. However, in these applications, it generally has a drawback such that it affords a cured product having brittleness and poor peeling strength.

An organic elastomeric polymer having at least one silicon-containing reactive group in a molecule has such an interesting characteristic that it can be cured even at a room temperature to give an elastomer. However, the cured elastomer has poor strength, which prevents its wide application.

SUMMARY OF THE INVENTION

An object of the present invention is to provide a curable resinous composition comprising an epoxy resin and an organic elastomeric polymer having a silicon-containing reactive group by which the brittleness and peeling strength of the epoxy resin and strength of the organic polymer are improved.

Accordingly, the present invention provides a curable resinous composition comprising:

(A) an organic elastomeric polymer having at least one silicon-containing reactive group in a molecule,
(B) an epoxy resin,
(C) a silicone compound having a silicon-containing reactive group and a functional group reactive with an epoxy group, and
(D) a curing agent for the epoxy resin, wherein said silicon-containing reactive group is a group of the formula:

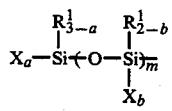   (I)

wherein X is a hydroxyl group or a hydrolyzable group, $R^1$ is a monovalent hydrocarbon group having 1 to 20 carbon atoms or an organosiloxy group, "a" is 0, 1, 2 or 3, "b" is 0, 1 or 2 provided that the total of "a" and "b" is at least 1, and "m" is 0 or an integer of 1 to 18, a weight ratio of (A) to (B) being from 1:100 to 100:1 and a weight ratio of (A)+(B) to (C) being from 100:0.1 to 100:20.

The present invention is based on the finding that the addition of the silicone compound (C) to a composition of the organic elastomeric polymer (A) and the epoxy resin (B) is very important to improve brittleness of the epoxy resin and strength of the polymer (A).

DETAILED DESCRIPTION OF THE INVENTION

Specific examples of the organic elastomeric polymer having at least one silicon-containing reactive group in a molecule (A) are polyethers prepared by ring opening polymerization of cyclic ethers (e.g. propyleneoxide, ethyleneoxide, tetrahydrofuran and the like); polyesters prepared by polycondensation of a dibasic acid (e.g. adipic acid) and glycol or ring opening polymerization of lactons; ethylene/propylene copolymers; polyisobutylene and copolymers of isobutylene with isoprene and the like; polychloroprene; polyisoprene and copolymers of isoprene with butadiene, styrene, acrylonitrile and the like; polybutadiene and copolymers of butadiene with styrene, acrylonitrile and the like; polyolefins prepared by hydrogenating polyisoprene, polybutadiene or isoprene/butadiene copolymers; polyacrylates prepared by radical polymerization of acrylate (e.g. ethyl acrylate, butyl acrylate and the like) and copolymers of acrylate with vinyl acetate, acrylonitrile, styrene, ethylene and the like; graft polymers prepared by polymerizing a vinyl monomer in the organic elastomeric polymer (A); polysulfides; and the like. Among them, preferable are polyethers comprising repeating units of the formula: —R—O— wherein R is a $C_1$-$C_4$ alkylene group (e.g. polypropyleneoxide and the like); graft polymers prepared by polymerizing a vinyl monomer (e.g. acrylate, styrene, acrylonitrile, vinyl acetate and the like) in the presence of polyether (e.g. polypropyleneoxide and the like); polyalkyl acrylate or copolymers of at least 50% by weight of alkyl acrylate with vinyl acetate, acrylonitrile, styrene, ethylene and the like, since they can introduce the silicon-containing reactive group at a chain end of the molecule and are suitable for the preparation of a liquid polymer in the absence of a solvent. Particularly, polypropyleneoxide is preferable since it imparts water resistance to the cured product and is cheap and easily handled as a liquid material.

The silicon-containing reactive group is represented by the formula:

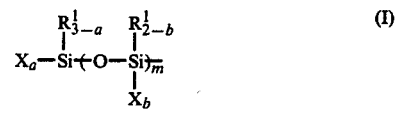   (I)

wherein X is a hydroxyl group or a hydrolyzable group, $R^1$ is a monovalent hydrocarbon group having 1 to 20 carbon atoms or an organosiloxy group, "a" is 0, 1, 2 or 3, "b" is 0, 1 or 2 provided that the total of "a" and "b" is at least 1, preferably from 1 to 4, and "m" is 0 or an integer of 1 to 18.

When X is the hydrolyzable group, the group (I) is cross linked through hydrolysis by water and a silanol condensation reaction in the presence or absence of a catalyst for the silanol condensation. When X is a hydroxyl group, the group (I) is cross linked through the silanol condensation reaction in the presence or absence of a catalyst for silanol condensation.

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, the alkoxy group is preferable since it is mildly hydrolyzed and easily handled.

The silicon-containing reactive group has at least one silicon atom. When the silicon atoms are bonded through siloxane linkages, the silicon-containing reactive group preferably not more than 20 silicon atoms.

In the formula (I), when $R^1$ is the organosiloxy group, it may be an triorganosiloxy group of the formula:

$$(R')_3SiO—  \quad (II)$$

wherein R' is, the same or different, a $C_1$-$C_{20}$ monovalent hydrocarbon group.

Among the silicon-containing reactive group (I), a group of the formula:

$$\begin{array}{c} R^1_{3-a} \\ | \\ -Si-X_a \end{array} \quad (III)$$

wherein $R^1$ and X are the same as defined above, and "a" is 1, 2 or 3 is preferable.

The silicon-containing reactive group (I) chemically bonds to the backbone chain of the organic elastomeric polymer. It is not preferable for the silicon-containing reactive group to be bonded to the backbone chain through an bond structure of the formula: ≡Si-—O—C≡, since such structure tends to be cleavaged by water. A preferable bonding structure between the silicon atom of the reactive group and the backbone chain is, for example, a structure of the formula: ≡Si-—C≡. Most preferably, the reactive group is bonded to the backbone chain in the following chemical structure:

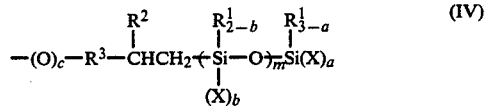

$$—(O)_c—R^3—CHCH_2(\!-Si—O\!-\!)_m Si(X)_a \quad (IV)$$

wherein $R^1$, X, a, b and m are the same as defined above. $R^2$ is a hydrogen atom or a $C_1$-$C_{20}$ monovalent organic group; $R^3$ is a $C_1$-$C_{20}$ divalent organic group; and "c" is 0 or 1.

The silicon-containing reactive group may be introduced in the organic elastomeric polymer by following manners;

(1) Copolymerizing a monomer having a copolymerizable unsaturated bond and the silicon-containing reactive group (e.g. vinyltrialkoxysilane, methacryloyloxypropylmethyldialkoxysilane, methacryloyloxypropyltrialkoxysilane and the like) with a polymerizable monomer (e.g. ethylene, propylene, isobutylene, chloroprene, isoprene, butadiene, acrylate and the like); or copolymerizing a monomer having a copolymerizable epoxy group and the silicon-containing reactive group (e.g. γ-glycidoxypropyltrimethoxysilane, γ-glycidoxypropylmethyldimethoxysilane and the like) with propyleneoxide or ethyleneoxide. By this manner, the silicon-containing reactive group is introduced in the side chain of the organic polymer.

(2) Polymerizing a radically polymerizable monomer in the presence of a mercapto or disulfide type chain transfer agent having the silicon-containing reactive group (e.g. mercaptopropyltrialkoxysilane, mercaptopropylmethyldialkoxysilane and the like).

(3) Polymerizing a radically polymerizable monomer by the use of an azo or peroxide type polymerization initiator having the silicon-containing reactive group (e.g. azobis-2-(6-methyldiethoxysilyl-2-cyanohexane) and the like).

By the manners (2) and (3), the silicon-containing reactive group is introduced at the chain end of the polymer molecule.

(4) Reacting a compound having a functional group Y' and the silicon-containing reactive group with a polymer having a functional group Y reactive with the functional group Y' (e.g. a hydroxyl group, a carboxyl group, a mercapto group, an epoxy group, an isocyanate group and the like) on the side chain and/or at the chain end of the molecule.

Specific examples of the reaction (4) are shown in following Table.

TABLE 1

| Functional group Y | Functional group Y' | Resulting bond |
|---|---|---|
| —COOH | HO— | —COO— |
| ↑ | CH$_2$——CH— \newline \\O/ | —COOCH$_2$CH— \newline \| \newline OH |
| ↑ | H$_2$N— | COO$^-$H$_3\overset{+}{N}$— or —CONH— |
| ↑ | OCN— | —COOCONH— |
| ↑ | CH$_2$=CHCOO— | —COOCH$_2$CH$_2$COO— |
| —OH | OCN— | —OCONH— |
| —SH | CH$_2$——CH— \newline \\O/ | —SCH$_2$CH— \newline \| \newline OH |
| ↑ | OCN— | —SCONH— |
| ↑ | CH$_2$=CHCOO— | —SCH$_2$CH$_2$COO— |
| ↑ | CH$_2$=CH— | —SCH$_2$CH$_2$— |
| ↑ | ClCH$_2$— | —SCH$_2$— |
| —CH——CH$_2$ \newline \\O/ | HOOC— | —CHCH$_2$OCO— \newline \| \newline OH |
| ↑ | HS— | —CHCH$_2$S— \newline \| \newline OH |
| ↑ | H$_2$N— | —CHCH$_2$NH— \newline \| \newline OH |
| ↑ | HO— | —CHCH$_2$O— \newline \| \newline OH |
| —NH$_2$ | CH$_2$——CH— \newline \\O/ | —NHCH$_2$—CH— \newline \| \newline OH |
| ↑ | OCN— | —NHCONH— |
| ↑ | HOOC— | —$\overset{+}{N}$H$_3$O$^-$CO— or —NHCO— |
| ↑ | ClCH$_2$— | —$\overset{+}{N}$H$_2$CH$_2$— \newline \| \newline Cl$^-$ |
| ↑ | CH$_2$=CHCOO— | —NHCH$_2$CH$_2$COO— |
| —CONH$_2$ | OCN— | —CONHCONH— |
| —CH=CH$_2$ | HS— | —CH$_2$CH$_2$S— |
| ↑ | H—Si≡ | —CH$_2$CH$_2$Si≡ |
| —NCO | HOOC— | —NHCOOCO— |
| ↑ | HO— | —NHCOO— |

TABLE 1-continued

| Functional group Y | Functional group Y' | Resulting bond |
|---|---|---|
| ↑ | HS— | —NHCOS— |
| ↑ | H₂N— | —NHCONH— |
| $-\text{CH}-\text{CH}-$ <br> $\phantom{-}\text{O}=\text{C}\phantom{--}\text{C}=\text{O}$ <br> $\phantom{----}\text{O}$ | HO— | $-\text{CH}-\text{CH}-$ <br> $\phantom{-}\text{O}=\text{C}\phantom{--}\text{C}=\text{O}$ <br> $\phantom{--}\text{HO}\phantom{--}\text{O}-$ |
| ↑ | H₂N— | $-\text{CH}-\text{CH}-$ <br> $\phantom{-}\text{O}=\text{C}\phantom{--}\text{C}=\text{O}$ <br> $\phantom{--}\text{HO}\phantom{--}\text{NH}-$ |

Specific examples of the polymer having the functional group Y are polyetherpolyols comprising repeating units of the formula: —R—O— wherein R is a C₂–C₄ alkylene group (e.g. polypropylenepolyol, polyethylenepolyol, polytetramethylenediol and the like); polyesterpolyols prepared by polycondensation of a dibasic acid (e.g. adipic acid) and glycol or ring opening polymerization of lactons; polyols or polycarboxylic acids of polyisobutylene; polyols or polycarboxylic acids of polybutadiene or copolymers of butadiene with styrene, acrylonitrile and the like; polyols of polyolefins prepared by hydrogenating polyisoprene or polybutadiene; polymer having an isocyanate functional group prepared by reacting the above polyols or polycarboxylic acids with polyisocyanate; polymers having an ethylenically unsaturated bond prepared by reacting the above polyols with a halogen-containing ethylenically unsaturated compound, and the like. Among them, preferable are those having the functional group Y at the chain end of the molecule.

Specific examples of the silicon-containing compound having the functional group Y' are amino group-containing silanes (e.g. γ-(2-aminoethyl)aminopropyltrimethoxysilane, γ-(2-aminoethyl)aminopropylmethyldimethoxysilane, γ-aminopropyltriethoxysilane and the like); mercapto group-containing silanes (e.g. γ-mercaptopropyltrimethoxysilane, γ-mercaptopropylmethyldimethoxysilane and the like); epoxysilanes (e.g. γ-glycidoxypropyltrimethoxysilane, β-(3,4-epoxycyclohexyl)ethyltrimethoxysilane and the like); ethylenically unsaturated silanes (e.g. vinyltriethoxysilane, γ-methacryloyloxypropyltrimethoxysilane, γ-acryloyloxypropylmethyldimethoxysilane and the like); chlorine-containing silanes (e.g. γ-chloropropyltrimethoxysilane and the like); isocyanate-containing silanes (e.g. γ-isocyanatepropyltriethoxysilane, γ-isocyanatepropylmethyldimethoxysilane and the like); and hydrosilanes (e.g. methyldimethoxysilane, trimethoxysilane, methyldiethoxysilane and the like.

Among the combinations of the polymer having the functional group Y and the compound having the functional group Y', (i) a combination of the polymer having an isocyanate group and the amino group- or mercapto group-containing silane and (ii) a combination of the polymer having an ethylenically unsaturated group and the hydrosilane are preferable. Among the combination (ii), a combination of polypropyleneoxide having an allylether group at the chain end and the hydrosilane is particularly preferable. In the combination (ii), a silyl group can be introduced in the polymer by a hydrosilylation reaction in the presence of a platinum catalyst.

The organic polymer (A) has at least one, preferably 1.2 to 6 silicon-containing reactive groups in a molecule on the average. When the number of the silicon-containing group in a molecule is less than one on the average, the composition of the invention is not effectively cured and the improvement of the properties is not satisfactorily achieved. Preferably, the silicon-containing reactive group is attached to the chain end of the organic polymer molecule, because the terminal silicon-containing reactive group elongates the chain length between the adjacent cross linking sites in the cured product so that, on one hand, the brittleness of the epoxy resin is more effectively improved, and on the other hand, the elastomeric cured product comprising predominantly the polymer (A) has better strength.

The molecular weight of the organic polymer (A) is usually from 500 to 50,000, preferably from 1,000 to 20,000 since in this molecular weight range, the polymer is in a liquid state.

The silicon-containing reactive group having a silicon atom to which a hydroxyl group is attached may be prepared by hydrolyzing the silicon-containing reactive group having a silicon atom to which a hydrolyzable group is attached.

Preferable examples of the organic polymer (A) are disclosed in U.S. Pat. Nos. 3,408,321, 3,453,230 and 3,592,795, Japanese Patent Publication No. 32673/1974, Japanese Patent Kokai Publication (unexamined) Nos. 156599/1975, 73561/1976, 6096/1979, 13767/1980, 13768/1980, 82123/1980, 123620/1980, 125121/1980, 131021/1980, 131022/1980, 135135/1980, 137129/1980, 179210/1982, 191703/1983, 78220/1984, 78221/1984, 78222/1984, 78223/1984 and 168014/1984.

The epoxy resin (B) may be any one of conventionally used ones. Specific examples of the epoxy resin (B) are flame-retardant epoxy resins (e.g. epichlorohydrin-bisphenol A type epoxy resin, epichlorohydrin-bisphenol F type epoxy resin, glycidyl ether of tetrabromobisphenol A and the like), novolak type epoxy resins, hydrogenated bisphenol A type epoxy resins, epoxy resins of the type of glycidyl ether of bisphenol A-propyleneoxide adduct, glycidyl p-oxybenzoate type epoxy resin, m-aminophnol type epoxy resins, diaminodiphenylmethane type epoxy resins, urethane modified epoxy resins, alicyclic epoxy resins, glycidyl ether of polyhydric alcohol (e.g. N,N-diglycidylaniline, N,N-diglycidyl-o-toluidine, triglycidylisocyanurate, polyalkyleneglycol diglycidyl ether, glycerin and the like), hydantoin type epoxy resins, epoxidized unsaturated polymer such as petroleum resin, and the like. Among them, those having two epoxy groups of the formula:

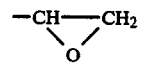

in a molecule are preferable since they are highly reactive during curing and the cured product easily forms a three dimensional network. Most preferable are the bisphenol A type epoxy resins and the novolak type epoxy resins.

The curing agent (D) for the epoxy resin used according to the present invention may be any one of the conventionally used ones. Specific examples of the curing agent are amines (e.g. triethylenetetramine, tetraethylenepentamine, diethylaminopropylamine, N-aminoethylpiperazine, m-xylenediamine, m-phenylenediamine, diaminodiphenylmethane, diaminodiphenylsulfone, isophoronediamine, 2,4,6-tris-(dimethylaminomethyl)phenol and the like); tert-amine salts; polyamide resins; imidazoles; dicyanediamides; complex compounds of boron trifluoride, carboxylic acid anhydrides (e.g. phthalic anhydride, hexahydrophthalic anhydride, tetrahydrophthalic anhydride, endomethylenetetrahydrophthalic anhydride, dodecinyl succinic anhydride, pyromellitic anhydride, chlorendic anhydride and the like); alcohols; phenols; and carboxylic acids.

The amount of the curing agent (D) varies with the kinds of the epoxy resin and/or the curing agent. Usually, 0.1 to 300 parts by weight of the curing agent (D) is used based on 100 parts by weight of the epoxy resin (B).

The resinous composition according to the present invention contains the silicone compound having a silicon-containing reactive group and a functional group reactive with an epoxy group (C) as one of the essential components.

Examples of the functional group reactive with the epoxy group are a primary, secondary or tertiary amino group, a mercapto group, an epoxy group and a carboxyl group. The silicon-containing reactive group is the same as that of the organic polymer (A). Particularly, the alkoxysilyl group is preferable due to its good handling properties.

Specific examples of the silicone compound (C) are amino group-containing silanes (e.g. $\gamma$-aminopropyltrimethoxysilane, $\gamma$-aminopropyltriethoxysilane, $\gamma$-aminopropylmethyldimethoxysilane, $\gamma$-(2-aminoethyl)aminopropyltrimethoxysilane, $\gamma$-(2-aminoethyl)aminopropylmethyldimethoxysilane, $\gamma$-(2-aminoethyl)aminopropyltriethoxysilane, $\gamma$-ureidopropyltriethoxysilane, N-$\beta$-(N-vinylbenzylaminoethyl)-$\gamma$-aminopropyltrimethoxysilane, $\gamma$-anilinopropyltrimethoxysilane and the like); mercapto group-containing silanes (e.g. $\gamma$-mercaptopropyltrimethoxysilane, $\gamma$-mercaptopropyltriethoxysilane, $\gamma$-mercaptopropylmethyldimethoxysilane, $\gamma$-mercaptopropylmethyldiethoxysilane and the like); epoxy group-containing silanes (e.g. $\gamma$-glycidoxypropyltrimethoxysilane, $\gamma$-glycidoxypropylmethyldimethoxysilane, $\gamma$-glycidoxypropyltriethoxysilane, $\beta$-(3,4-epoxycyclohexyl)ethyltrimethoxysilane and the like); carboxysilanes (e.g. $\beta$-carboxyethyltriethoxysilane, $\beta$-carboxyethylphenylbis(2-methoxyethoxy)silane, N-$\beta$-(N-carboxymethylaminoethyl)-$\gamma$-aminopropyltrimethoxysilane and the like). The silane compound may be used along or as a mixture with at least one other silane compound.

A weight ratio of the epoxy resin (B) to the organic polymer (A) is from 100:1 to 1:100. When the amount of the organic polymer (A) is less than the lower limit, impact strength or toughness of the cured product is not desirably improved. When the amount of the organic polymer (A) exceeds the upper limit, the strength of the cured product is insufficient. A preferable weight ratio of the epoxy resin (B) to the organic polymer (A) varies with the final use of the cured product. In order to improve impact resistance, flexibility, toughness and peel strength of the cured epoxy resin, 1 to 100 parts by weight, preferably 5 to 100 parts by weight of the organic polymer (A) is used based on 100 parts by weight of the epoxy resin (B). In order to improve strength of the cured organic elastomeric polymer, 1 to 200 parts by weight, preferably 5 to 100 parts by weight of the epoxy resin is used based on 100 parts by weight of the organic polymer (A).

The amount of the silicone compound (C) is so selected that a weight ratio of the total weight of the organic polymer (A) and the epoxy resin (B) to the weight of the silicone compound (C), i.e. (A+B)/C, is from 100:0.1 to 100:20, preferably from 100:0.2 to 100:10.

The curable resinous composition of the invention may be prepared by mixing the four components (A), (B), (C) and (D) according to a conventional method. For example, the components are mixed with a mixer, rolls or a kneader at a room or elevated temperature. Alternatively, the components are dissolved in a suitable solvent and mixed. By a suitable combination of the components, a one pack type or two pack type composition can be prepared.

In addition to the four essential components (A), (B), (C) and (D), the composition of the invention may optionally contains other conventionally used additives such as a filler, a plasticizer, a silanol condensation catalyst for curing the organic polymer (A), an antiaging agent, a ultraviolet absorbing agent, a lubricant, a pigment, a foaming agent and the like.

Specific examples of the filler are wood meal, pulp, cotton chip, asbestos, glass fiber, carbon fiber, mica, walnut shell flour, rice hull flour, graphite, diatomaceous earth, china clay, fumed silica, precipitated silica, silicic anhydride, carbon black, calcium carbonate, clay, talc, titanium oxide, magnesium carbonate, quartz powder, aluminum powder, flint powder, zinc powder, and mixtures thereof.

The curable composition of the invention can be cured at a room temperature although the curing rate is increase at an elevated temperature of 100° to 150° C. When the composition is cured at a room temperature, the epoxy resin (B) and the curing agent (C) are so selected. In addition, when the liquid epoxy resin is used, a non-solvent type curable composition of the invention is prepared.

The composition of the present invention may be formed by a conventional molding method.

When the composition contains the epoxy resin (B) in an amount larger than that of the organic polymer (A), it is preferably molded by the same method as used for molding the epoxy resin, for example, compression molding, transfer molding and injection molding. Thereby, a molded article and a laminated article (e.g. copper-clad laminate and compressed laminated wood) having improved impact resistance, flexibility and toughness are produced. The composition having the above ratio of the epoxy resin (A) and the organic polymer (B) may be used as an adhesive with improved peel strength, a foam plastic with improved flexibility, a binding agent for a fiber board or a particle board, a coating, a binding agent for shell molding, a binder of a brake lining, a binder of a grindstone and a matrix resin of a composite material containing glass fiber or carbon fiber.

When the composition contains the organic polymer (A) in an amount larger than that of the epoxy resin (B), it is preferably molded by the same method as used for molding a solid rubber such as a natural rubber or a liquid elastomer such as polyurethane. Thereby, a molded elastomeric article and an expanded elastomeric article having improved strength are produced. The composition having the above ratio of the epoxy resin (A) and the organic polymer (B) may be used as an adhesive with improved peel strength, a sealing agent and a pressure sensitive adhesive.

The present invention will be hereinafter explained further in detail by following examples, wherein parts are by weight unless otherwise indicated.

PREPARATION EXAMPLE 1

To a flask equipped with a stirrer, polypropyleneoxide (Average molecular weight, 3,000) (300 g) was charged followed by the addition of tolylenediisocyanate (26 g) and dibutyltin dilaurate (0.2 g). The mixture was stirred at 100° C. for 5 hours in a stream of nitrogen gas. Then, γ-aminopropyltriethoxysilane (22.1 g) was added to the mixture and stirred at 100° C. for 3 hours to obtain polyether having a triethoxysilyl group at a chain end and about two silicon-containing reactive groups in a molecule. Average molecular weight, about 6,600.

PREPARATION EXAMPLE 2

To an autoclave equipped with a stirrer, polypropyleneoxide 97% of the terminal groups of which being allylether groups (Average molecular weight, 8,000) (800 g) was charged followed by the addition of methyldimethoxysilane (19 g). Then, a solution of chloroplatinic acid (8.9 g of $H_2PtCl_6.6H_2O$ dissolved in a mixture of 18 ml of isopropyl alcohol and 160 ml of tetrahydrofuran) (0.34 ml) was added, and the reaction was carried out at 80° C. for 6 hours.

An amount of the unreacted hydrogenated silicon-containing group in the reaction mixture was monitored by IR spectrum analysis to find that substantially no said group remained. According to determination of the silicon-containing group by NMR, it was confirmed that polypropyleneoxide having, at the chain end, about 1.7 groups of the formula:

$$(CH_3O)_2Si(CH_3)CH_2CH_2CH_2O—$$

in a molecule on the average.

PREPARATION EXAMPLE 3

To a flask equipped with a stirrer, polypropyleneoxide-triol (Average molecular weight, 3,000) (300 g) was charged followed by the addition of metal sodium (9.2 g) and xylene (600 ml) and reacted at 120° C. for 5 hours in a stream of nitrogen gas. Then, the reaction mixture was cooled to 80° C. After adding dibromomethane (17.4 g), the mixture was reacted for 5 hours. Thereafter, acrylic chloride (36.2 g) was added and reacted at 80° C. for 6 hours. The reaction mixture was cooled to a room temperature and filtered to remove the salt. From the reaction mixture, xylene was evaporated off to obtain a polymer having about 4 groups of $CH_2=CHCO—$ at the chain ends per molecule. Average molecular weight, about 6,100.

To a flask equipped with a stirrer, 61 g of the obtained polymer and γ-aminopropyltrimethoxysilane (5.4 g) were charged and reacted at 110° C. for 10 hours to obtain polyether having about 3 trimethoxysilyl groups per molecule. Average molecular weight, about 6,600.

PREPARATION EXAMPLE 4

To a reactor, polypropyleneoxide 90% of the terminal groups of which being $CH_2=CHCH_2CO—$ (Average molecular weight, 8,000) (100 g) was charged followed by the addition of methyldimethoxysilane (1.77 g) and a 10% solution of chloroplatinic acid ($H_2PtCl_6.6H_2O$) in isopropyl alcohol (0.013 g). The mixture was reacted at 80° C. for 4 hours. After confirming disappearance of absorption by Si—H near 2,100 cm$^{-1}$ in IR spectrum, the reaction was terminated.

The iodine number of the product was 2.0. Form this number, it was found that the product had, on the average, 1.2 silicon-containing reactive group and 0.6 polymerizable unsaturated group per molecule.

100 g of the product was charged in a reactor, degassed under reduced pressure, replaced with nitrogen gas and heated to 90° C. with stirring. Then, a mixture of n-butyl acrylate (95.4 g), tris(2-hydroxyethyl)isocyanuric acid triacrylate (1.8 g), γ-methacryloyloxypropyldimethoxymethylsilane (1.5 g), γ-mercaptopropyldimethoxymethylsilane (2.3 g) and 2,2'-azobisisbutyronitrile (hereinafter referred to as "AIBN") (0.5 g) was dropwise added over 2 hours in an atmosphere of nitrogen. After 15 and 30 minutes from the completion of addition of the mixture, AIBN (each 0.25 g dissolved in 4 time weight of acetone) was further added. Thereafter, the reaction mixture was stirred for 30 minutes to obtain a slightly yellowish viscous liquid polymer. Viscosity, 460 P (23° C.)

PREPARATION EXAMPLE 5

Butyl acrylate (80 g), vinyl acetate (20 g), γ-methacryloyloxypropylmethyldimethoxysilane (2.3 g), γ-mercaptopropylmethyldimethoxysilane (1.8 g) and azo-bis-2-(6-methyldiethoxysilyl-2-cyanohexane) (1.0 g) were homogeneously mixed. 25 g of the mixture was then charged in a four-necked 200 ml flask equipped with a stirrer and a condenser and heated at 80° C. on an oil bath with introducing nitrogen gas. Within several minutes, the polymerization was initiated to generate heat. After the heat generation calmed, the rest of the mixture was dropwise added over 3 hours to proceed polymerization. After the heat generation ceased, the polymerization was terminated. The produced polymer had an average molecular weight of about 11,000 according to GPC analysis.

EXAMPLE 1 AND COMPARATIVE EXAMPLES 1-2

Bisphenol A type epoxy resin (Epikote 828 (trade name) manufactured by Yuka Shell Epoxy Co., Ltd.) (50 parts), the polymer prepared in Preparation Example 2 (100 parts), 2,2'-methylene-bis-(4-methyl-6-t-butylphenol) (1 part), 2,4,6-tris-(dimethylaminomethyl)-phenol (2.5 parts), N-β-(aminoethyl)-γ-aminopropyl-trimethoxysilane (2.5 parts) and dibutyltin laurate (1 part) were thoroughly mixed and carefully poured in a polyethylene made frame so as to avoid the formation of bubbles. Then, the mixture was cured at 23° C. for 7 days and post-cured at 50° C. for 7 days to produce a sheet of the cured product having a thickness of 2 mm.

From the sheet, a No. 3 dumbbell was punched according to JIS (Japanese Industrial Standard) K 6301. Tensile strength at break ($T_B$) and elongation at break ($E_B$) were measured at a pulling rate of 500 mm/min. to find that $T_B$ was 75 kg/cm$^2$ and $E_B$ was 460%.

For comparison, in the same manner as in Example 1 but not using N-β-(aminoethyl)-γ-aminopropyltrime-thoxysilane, a sheet of a cured product was produced. $T_B$ was 7 kg/cm$^2$.

Further, in the same manner as in Example 1 but not using Epikote 828, a sheet of a cured product was produced. $T_B$ was 5 kg/cm$^2$.

EXAMPLES 2-5

In the same manner as in Example 1 but using the polymer prepared in Preparation Example 1, 3, 4 or 5 in place of the polymer prepared in Preparation Example 2, a sheet of a cured product was produced. $T_B$ and $E_B$ of each sheet are shown in Table 2.

TABLE 2

| Example No. | 2 | 3 | 4 | 5 |
|---|---|---|---|---|
| Polymer | Prep. Ex. 1 | Prep. Ex. 3 | Prep. Ex. 4 | Prep Ex. 5 |
| $T_B$ (kg/cm$^2$) | 152 | 114 | 42 | 28 |
| $E_B$ (%) | 260 | 340 | 440 | 240 |

EXAMPLES 6-8

In the same manner as in Example 1 but using a silicone compound in an amount as shown in Table 3 in place of N-β-(aminoethyl)-γ-aminopropyltrimethoxysilane, a sheet of a cured product was produced. $T_B$ and $E_B$ of each sheet are shown in Table 3.

TABLE 3

| Example No. | 6 | 7 | 8 |
|---|---|---|---|
| Silicone compound (parts) | γ-Aminopropyl-triethoxysilane (4) | γ-glycidoxy-propylmethoxy-silane (6) | γ-mercapto-propylmethoxy-silane (4) |
| $T_B$ (kg/cm$^2$) | 82 | 31 | 72 |
| $E_B$ (%) | 420 | 410 | 430 |

EXAMPLES 9-11

In the same manner as in Example 1 but using an epoxy resin and a curing agent in amounts as shown in Table 4, a sheet of a cured product was produced. $T_B$ and $E_B$ of each sheet are shown in Table 4.

TABLE 4

| Example No. | 9 | 10 | 11 |
|---|---|---|---|
| Epoxy resin*[1] (parts) | Epikote 834 (3) | Epikote 1001 (20) | Epikote 152 (10) |
| Curing agent*[2] (parts) | G-624 (15) | TETA (2) | DMP-30 (1.5) |
| $T_B$ (kg/cm$^2$) | 56 | 43 | 23 |
| $E_B$ (%) | 480 | 400 | 560 |

Note:
*[1]Epikote 834 and 1001: Bisphenol A type epoxy resin (Yuka Shell Epoxy Co. Ltd.)
Epikote 152: Phenol novolak type epoxy resin (Yuka Shell Epoxy Co. Ltd.).
*[2]G-624: Polyamide resin (Tokyo Kasei Co., Ltd.).
TETA: Triethylenetetraamine.
DMP-30: 2,4,6-Tris(dimethylaminomethyl)phenol.

EXAMPLE 12

The polymer prepared in Preparation Example 1 (25 parts), 2,2'-methylene-bis-(4-methyl-6-t-butylphenol) (0.5 part), Epikote 828 (100 parts), isophoronediamine (25 parts), water (0.05 part), dibutyltin dilaurate (1 part) and N-β-(aminoethyl)-γ-aminopropyltrimethoxysilane (4 parts) were thoroughly mixed and degassed. Then, the mixture was poured in polyethylene made frame and cured at 50° C. for 1 day and then at 150° C. for 2 hours. The Izod impact strength of the cured product was 6.1 Kg·cm/cm.

EXAMPLES 13-30 AND COMPARATIVE EXAMPLES 3-5

The polymer prepared in Preparation Example 2 (100 parts), Epikote 828 (50 parts), a silane compound shown in Table 5, an epoxy resin curing agent shown in Table 5, a bisphenol type antioxidant (Noklack NS-6 manufactured by Ohuchi Shinko Kabushikikaisha) (1 part) and a silanol condensation catalyst shown in Table 5 were thoroughly mixed. The adhesive characteristics (tensile shear strength and T-shape peeling strength) of the mixture were evaluated according to the methods defined by JIS (Japanese Industrial Standard) K 6850 and K 6854.

TENSILE SHEAR STRENGTH

On an aluminum plate (according to JIS H 4000. A-1050P. 100 mm×25 mm×2.0 mm), the mixture was coated in a thickness of about 0.05 mm. A pair of the same plates coated with the mixture were laminated with facing the coated surfaces to each other and pressed by hand. The laminated plates were kept at 23° C. for one day and then at 50° C. for three days and peeled off at a pulling rate of 50 mm/min. to measure the tensile shear strength.

T-SHAPE PEELING STRENGTH

On an aluminum plate (according to JIS H 4000. A-1050P. 200 mm×25 mm×0.1 mm), the mixture was coated in a thickness of about 0.5 mm. A pair of the same plates coated with the mixture were laminated with facing the coated surfaces to each other and pressed five times by moving a hand roller with 5 kg of load along the length in one direction. The laminated plates were kept at 23° C. for one day and then at 50° C. for three days and peeled off at a pulling rate of 200 mm/min. to measure the T-shape peeling strength.

The results are shown in Table 5.

In Table 5, the results of the compositions of Comparative Examples 3 to 5 are also shown.

The composition of Comparative Example 3 was the same as that of Example 13 except that the silane compound was not used. The composition of Comparative Example 4 was the same as that of Example 19, 29 or 30 except that the organic polymer having silicon-containing reactive group and the silanol condensation catalyst were not used.

The composition of Comparative Example 5 is a conventional adhesive composition of the epoxy resin.

The results shown in Table 5 clearly indicate that peeling strength is improved by the use of the compositions of the present invention.

TABLE 5

| Example No. | Silanol condensation catalyst (parts)(*[1]) | Epoxy resin curing agent (parts)(*[2]) | Silane compound (parts) | Tensile shear strength (kg/cm$^2$) | T-shape peeling strength (kg/cm$^2$) |
|---|---|---|---|---|---|
| 13 | #918 (2) | DMP-30 (5) | $NH_2C_2H_4NHC_3H_6Si(OCH_3)_3$ (2.5) | 110 | 12.0 |
| 14 | ↑ (1) | TETA (5) | $NH_2C_3H_6Si(OCH_3)_3$ (1.5) | 65 | 4.0 |
| 15 | ↑ | TD 982 (10) | $NH_2C_2H_4NHC_3H_6Si(OCH_3)_3$ (1.5) | 75 | 6.5 |
| 16 | Stann BL (2) | DMP-30 (5) | ↑ (2.0) | 90 | 9.0 |
| 17 | ↑ | ↑ | $HSC_3H_6Si(OCH_3)_3$ (1.5) | 70 | 7.5 |
| 18 | Stann SB65 (2) | TETA (5) | $NH_2C_3H_6Si(OCH_2CH_3)_3$ (1.5) | 60 | 4.5 |

TABLE 5-continued

| Example No. | Silanol condensation catalyst (parts)(*1) | Epoxy resin curing agent (parts)(*2) | Silane compound (parts) | Tensile shear strength (kg/cm$^2$) | T-shape peeling strength (kg/cm$^2$) |
|---|---|---|---|---|---|
| 19 | LF 101 (2) | DMP-30 (5) | NH$_2$C$_2$H$_4$NHC$_3$H$_6$Si(OCH$_3$)$_3$ (1.0) | 130 | 12.0 |
| 20 | ↑ (0.5) | ↑ | NH$_2$C$_2$H$_4$NHC$_2$H$_4$NHC$_3$H$_6$Si(OCH$_3$)$_3$ (0.5) | 120 | 12.5 |
| 21 | ↑ | TETA (5) | NH$_2$C$_3$H$_6$Si(OCH$_3$)$_3$ (1.0) | 70 | 4.8 |
| 22 | ↑ (1.0) | DMP-30 (5) | $\underset{\diagdown}{CH_2}\!\!-\!\!\overset{O}{\overset{\diagup}{\phantom{X}}}\!\!CHCH_2OC_3H_6Si(OCH_3)_3$ (1.0) | 80 | 7.2 |
| 23 | ↑ | ↑ | NH$_2$C$_2$H$_4$NHC$_3$H$_6$Si(OCH$_3$)$_2$CH$_3$ (1.5) | 110 | 9.5 |
| 24 | DBTA (2) | ↑ | NH$_2$C$_2$H$_4$NHC$_3$H$_6$Si(OCH$_3$)$_3$ (0.5) | 120 | 12.5 |
| 25 | DBTA (1) | TETA (5) | NH$_2$C$_3$H$_6$Si(OCH$_3$)$_3$ (1.0) | 73 | 5.1 |
| 26 | ↑ | TD 982 (10) | ↑ | 70 | 6.5 |
| 27 | ↑ | DMP-30 (5) | HOOCC$_2$H$_4$Si(OCH$_2$CH$_3$)$_3$ (2.0) | 70 | 7.3 |
| 28 | Kerope S (2) | ↑ | NH$_2$C$_3$H$_6$Si(OCH$_3$)$_3$ (1.0) | 110 | 6.5 |
| 29 | ↑ (1) | ↑ | NH$_2$C$_2$H$_4$NHC$_3$H$_6$Si(OCH$_3$)$_3$ (1.0) | 120 | 7.2 |
| 30 | ALCH (2) | ↑ | ↑ | 95 | 6.3 |
| Com. 3 | #918 (2) | DMP-30 (5) | None | 18 | 3.2 |
| Com. 4(*3) | None | ↑ | NH$_2$C$_2$H$_4$NHC$_3$H$_6$Si(OCH$_3$)$_3$ (1.0) | 50 | Note(*5) |
| Com. 5(*4) | None | None | None | 122 | Note(*5) |

Note
(*1)#918, Stann BL and SB65: Organic tin compounds (Sankyo Organic Synthesis Co., Ltd., Japan).
LF 101: An organic tin compound (Tokyo Fine Chemical Co., Ltd., Japan).
DBTA: Dibutyltin deacetylacetonate.
Kerope S: An organic aluminum compound (Hope Pharmaceuticals Co., Ltd., Japan).
ALCH: An organic aluminum compound (Kawaken Fine Chemical Co., Ltd., Japan).
(*2)DMP-30 and TETA: See Note(*2) of Table 4.
TD 982: Polyamide resin (Dainippon Ink Kagaku Co. Ltd., Japan).
(*3)Epikote 828:DMP-30:NH$_2$C$_2$H$_4$NHC$_3$H$_6$Si(OCH$_3$)$_3$ = 50:10:1 (parts by weight).
(*4)An epoxy type adhesive (E Set M by Konishi Co., Ltd.).
(*5)Very easily peeled off.

PREPARATION EXAMPLE 6

To a reactor, the polymer prepared in Preparation Example 2 (75 g) was charged, evacuated under reduced pressure and flashed with a nitrogen gas. After heated to 90° C. and stirred, a mixture of n-butyl acrylate (24.5 g), γ-mercaptopropylmethyldimethoxysilane (0.4 g) and AIBN (0.1 g) was dropwise added over 1 hour in an atmosphere of nitrogen. After 15 and 30 minutes from the completion of addition of the mixture, AIBN (each 0.0025 g dissolved in 4 time weight of acetone) was further added. Thereafter, the reaction mixture was stirred for 30 minutes to obtain a slightly yellowish viscous liquid polymer having Brookfield viscosity of 260 poise (23° C). According to the GC analysis, the amount of the unreacted monomers was 0.9%.

PREPARATION EXAMPLE 7

In the same manner as in Preparation Example 6 but using a mixture of n-butyl acrylate (19.6 g), acrylonitrile (4.9 g), γ-mercaptopropylmethyldimethoxysilane (0.4 g) and AIBN (0.1 g), a polymer were prepared. Viscosity, 410 poise (23° C.). Amount of the unreacted monomers, 1.1%.

PREPARATION EXAMPLE 8

In the same manner as in Preparation Example 6 but using 50 g of the polymer prepared in Preparation Example 2 and a mixture of n-butyl acrylate (47.13 g), γ-mercaptopropylmethyldimethoxysilane (1.62 g) and AIBN (0.4 g), a polymer was prepared. Viscosity, 235 poise. Amount of the unreacted monomers, 0.8%.

PREPARATION EXAMPLE 9 n-Butyl acrylate (95.84 g), γ-mercaptopropylmethyldimethoxysilane (2.02 g), γ-methacryloxypropylmethyldimethoxysilane (1.57 g), neopentylglycol diacrylate (0.30 g) and AIBN (0.25 g) were homogeneously mixed. 30 g of the mixture was then charged in a four-necked 200 ml flask equipped with a stirrer and a condenser and heated at 80° C. on an oil bath with introducing nitrogen gas. Within several minutes, the polymerization was initiated to generate heat. After the heat generation calmed, the rest of the mixture was dropwise added over 3 hours to proceed polymerization. After 15 and 30 minutes from the completion of addition of the mixture, a 20% solution of AIBN in acetone (each 60 μl) was further added. Thereafter, the reaction mixture was heated with stirring for 30 minutes to obtain a transparent colorless viscous liquid polymer having Brookfield viscosity of 300 poise (23° C.). According to the GC analysis, the amount of the unreacted monomers was 2.5%.

PREPARATION EXAMPLE 10

In the same manner as in preparation Example 9 but using a mixture of n-butyl acrylate (95.05 g), γ-mercaptopropylmethyldimethoxysilane (2.68 g), vinylmethyldimethoxysilane (1.96 g) and AIBN (0.30 g), a polymer was prepared. Viscosity, 180 poise. Amount of the unreacted monomers, 1.7%.

PREPARATION EXAMPLE 11

In the same manner as in Preparation Example 9 but using a mixture of n-butyl acrylate (94.57 g), γ-mercaptopropylmethyldimethoxysilane (1.99 g), 1,1,3,3-tetramethyl-1,3-divinyldisiloxane (1.03 g), vinyltriethoxysilane (2.11 g) and AIBN (0.30 g), a polymer was prepared. Viscosity, 630 poise. Amount of the unreacted monomers, 1.2%.

PREPARATION EXAMPLE 12

In the same manner as in Preparation Example 9 but using a mixture of n-butyl acrylate (96.89 g), γ-mercaptopropylmethyldimethoxysilane (1.37 g), vinylmethyldimethoxy silane (1.50 g) and AIBN (0.1 g), a polymer was prepared. Viscosity, 470 poise. Amount of the unreacted monomers, 2.8%.

EXAMPLES 31–44

The polymers prepared in Preparation Examples 6–12 were examined for their adhesive characteristics in the same manner as in Examples 13–30. The results are shown in Table 6.

elastomeric polymer (A) and/or the silicone compound (C) is a group of the formula:

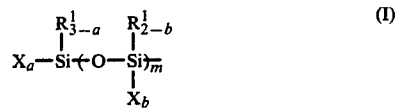

wherein X is a hydroxyl group or a hydrolyzable group, $R^1$ is a monovalent hydrocarbon group having 1 to 20 carbon atoms or an organosiloxy group, "a" is 0, 1, 2 or 3, "b" is 0, 1 or 2 provided that the total of "a" and "b" is at least 1, and "m" is 0 or an integer of 1 to 18, and a weight ratio of

TABLE 6

| Example No. | Prep. Example No. | Silanol condensation catalyst (parts)(*1) | Epoxy resin curing agent (parts)(*2) | Silane compound (parts) | Tensile shear strength (kg/cm²) | T-shape peeling strength (kg/cm²) |
|---|---|---|---|---|---|---|
| 31 | 6 | #918 (2) | DMP-30 (5) | $NH_2C_2H_4NHC_3H_6Si(OCH_3)_3$ (1) | 75 | 6.3 |
| 32 | 6 | Stann BL (1) | TETA (5) | $NH_2C_3H_6Si(OCH_3)_3$ (1.5) | 50 | 3.6 |
| 33 | 7 | #918 (1) | ↑ | $NH_2C_2H_4NHC_3H_6Si(OCH_3)_3$ (1) | 65 | 3.1 |
| 34 | 7 | LF 101 (1.5) | DMP-30 (5) | ↑ | 85 | 3.5 |
| 35 | 8 | #918 (2) | ↑ | ↑ | 68 | 4.9 |
| 36 | 8 | LF 101 (1) | ↑ | 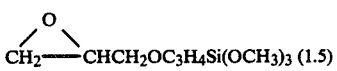 $CH_2$—CHCH$_2$OC$_3$H$_4$Si(OCH$_3$)$_3$ (1.5) | 55 | 4.1 |
| 37 | 9 | #918 (1) | TETA (5) | $NH_2C_2H_4NHC_3H_6Si(OCH_3)_3$ (0.5) | 53 | 1.5 |
| 38 | 9 | DBTA (1) (1) | TD 982 (10) | ↑ | 43 | 1.1 |
| 39 | 10 | #918 (1) | DMP-30 (5) | ↑ | 53 | 1.3 |
| 40 | 10 | Stann SB65 (1.5) | TETA (5) | $HSC_3H_6Si(OCH_3)_3$ (2.0) | 45 | 0.9 |
| 41 | 11 | #918 (2) | DMP-30 (5) | $NH_2C_3H_6Si(OCH_2CH_3)_3$ (1.5) | 54 | 1.3 |
| 42 | 11 | Stann BL (1.5) | ↑ | $NH_2C_2H_4NHC_3H_6Si(OCH_3)_3$ (1.0) | 42 | 1.0 |
| 43 | 12 | #918 (1) | ↑ | $HOOCC_2H_4Si(OCH_2CH_3)_3$ (2.0) | 51 | 1.7 |
| 44 | 12 | LF 101 (1) | TD 982 (10) | $NH_2C_2H_4NHC_3H_6Si(OCH_3)_3$ (0.5) | 47 | 1.4 |

What is claimed is:

1. A curable resinous composition comprising:
(A) an organic elastomeric polymer having at least one silicon-containing functional group in a molecule,
(B) an epoxy resin,
(C) a silicone compound having a silicon-containing group and a functional group reactive with an epoxy group, and
(D) a curing agent for the epoxy resin, wherein the silicon-containing functional group of the organic elastomeric polymer (A) and/or the silicone compound (C) is a group of the formula:

(A) to (B) is from 1:100 to 100:1 and a weight ratio of (A)+(B) to (C) is from 100:0.1 to 100:20.

2. A curable resinous composition according to claim 1 wherein the organic elastomeric polymer (A) is a polyether comprising repeating units of the formula: —R—O— wherein R is a $C_1$–$C_4$ alkylene group.

3. A curable resinous composition according to claim 1, wherein the organic elastomeric polymer (A) is a polymer having backbone chain consisting of polyalkyl acrylate or a copolymer comprising at least 50% by weight of alkyl acrylate.

4. A cured article produced by curing a resinous composition according to claim 1.

* * * * *